United States Patent [19]

Kratochwill

[11] Patent Number: 5,630,911

[45] Date of Patent: May 20, 1997

[54] APPARATUS FOR CONTINUOUS REMOVAL OF A SOLVENT OR OTHER LIQUID FROM SOLID PARTICLES OR GRANULES

[75] Inventor: William L. Kratochwill, Minneapolis, Minn.

[73] Assignee: Crown Iron Works Company, Roseville, Minn.

[21] Appl. No.: 374,333

[22] Filed: Jan. 18, 1995

[51] Int. Cl.$^6$ .............................. B01D 11/00; C10C 1/18
[52] U.S. Cl. .................. 196/14.52; 196/106; 196/112; 196/115; 196/138; 202/117; 202/173; 159/6.2; 159/16.2; 159/16.3
[58] Field of Search ..................... 196/14.52, 106, 196/112, 115, 138; 202/173, 160, 267.1, 117; 159/6.2, 16.2, 16.3, DIG. 8, 17

[56] References Cited

U.S. PATENT DOCUMENTS

| | | | |
|---|---|---|---|
| 4,260,457 | 4/1981 | Barns | 202/160 |
| 4,315,815 | 2/1982 | Gearhart | 208/321 |
| 4,770,747 | 9/1988 | Muller | 202/176 |
| 5,076,895 | 12/1991 | Greenfield et al. | 203/10 |

Primary Examiner—Nina Bhat
Attorney, Agent, or Firm—Nawrocki, Rooney & Sivertson, P.A.

[57] ABSTRACT

An apparatus for separating a solvent from solid or granular particles. The apparatus includes a fully enclosed vessel having multiple stages for effecting the solvent removal therein. Each stage includes an upper deck and a lower deck extending across the width of the vessel generally parallel to one another over a substantial portion of the length of the vessel. A first gear and a second gear are operatively located beyond the ends of the upper and lower decks. A means for conveying solid particles forms a continuous loop extending from the first gear over the lower deck, around the second gear and over the upper deck and back to the first gear. Drive means are provided for rotating the means for conveying solids. The lower deck is heated to a sufficient temperature to cause vaporization of at least a portion of the solvent contaminating the solid particles as the particles are conveyed over the heated deck. The means for conveying solids moves the solids through the apparatus so that the solids first to enter are the first to exit the apparatus to minimize residence time, reduce grinding or breaking of the solids, and minimize the likelihood that solid particles will be burned or stick to the apparatus.

19 Claims, 2 Drawing Sheets

APPARATUS FOR CONTINUOUS REMOVAL OF A SOLVENT OR OTHER LIQUID FROM SOLID PARTICLES OR GRANULES

TECHNICAL FIELD

The present invention relates generally to methods and apparatus for continuous treatment of a mass of solid particles containing or contaminated with a solvent or other fluid. More narrowly, it is directed to a method and apparatus for removing a solvent which forms a vapor heavier than air from a mass of solid particles contaminated therewith. The apparatus utilizes steam-heated decks over which solids are conveyed to effect the vaporization of the solvent with subsequent gravity flow of the vapor as separated from the particles. The apparatus is particularly useful for removing solvents from abrasive particles or particles which are sensitive to damage by mechanical action or heat.

BACKGROUND OF THE INVENTION

The use of organic solvents such as hexane, heptane, alcohols, water, and other liquids in processing chemicals or materials for industrial and consumer use is generally known. Within these general processes there are many known specific processes in which an organic solvent comes into contact with and/or contaminates solid particles or granules which are also utilized in that specific process.

A first example of a specific process which utilizes an organic solvent which comes into contact with and contaminates solid particles is the process for the extraction of oil from oil seeds. Upon preparation of the oil seeds, the particles are contacted with the hexane to extract the oil. A quantity of the hexane remains entrained or entrapped within the solid particles, and thus, requires desolventizing prior to further processing of the oil depleted particles.

A second well known process in the chemical industry is to utilize fixed-bed treatment systems, wherein a mass of particles, such as resinous beads or catalyst particles, are placed within a containment vessel through which other compounds flow for treatment or reaction as effected by the fixed-bed particles. Subsequent to processing a given quantity of material, the fixed-bed material must be removed. Upon removal, the particles, which are at times contaminated with organic solvents or other liquids, must be desolventized prior to disposal or reuse.

A third example of a situation wherein solid particles become contaminated with a solvent or hydrocarbon and must be desolventized includes the accidental contamination of soil from a spill of solvent or hydrocarbons. Examples which are well known include leaking underground storage tanks, or accidents related to the bulk transfer of chemicals via trailer or rail car. Soil contaminated with organic solvents must be desolventized to prevent leaching of the solvent into the ground water or to prevent further human contact.

Presently available desolventizing equipment is not designed for handling solids which can be abrasive. Abrasive solids would destroy a typical desolventizing unit equipped with sweep arms. Further, available desolventizing equipment utilizing sweep arms and paddles are not designed to completely remove the solids off the plates by each passing paddle. The increased residence time for isolated solids can cause burning of the solids to the hot decks and can greatly increase the grinding or breaking up of the solids as they are conveyed and mixed.

Accordingly, the need exists for a method and apparatus for efficiently removing solvents from a mass of particles contaminated therewith. An apparatus and method to remove such solvents should be designed to process abrasive particles. Further, such apparatus should be designed so that solids which are first to enter the unit are also the first to exit the unit to minimize residence time and reduce the likelihood that solid materials will be burned and stick to the apparatus. The solids should also be conveyed through the apparatus with minimum mixing to prevent the grinding or breaking up of the solids as they are conveyed.

The present invention addresses these needs, as well as other problems associated with existing methods and apparatus for removing solvents from solid particles contaminated therewith. The present invention also offers further advantages over the prior art and solves problems associated therewith.

SUMMARY OF THE INVENTION

The present invention is a method and apparatus for separating a liquid, particularly a solvent, from solids or particles contaminated therewith. The solvents can include organic compounds such as hexane, heptane, alcohols, water or other liquids. The apparatus is particularly useful for removing solvents which form a vapor that is heavier than air. The apparatus is specifically designed and intended to process and desolventize particles or solid granules which are abrasive without excessive wear to the apparatus. Further, the apparatus incorporates paddles which accomplish the complete removal of solids from a heated deck upon the single passing of a paddle. This prevents material from burning to the hot decks and greatly reduces the grinding or breaking up of the solids as they are conveyed through the apparatus.

The apparatus for removing solvents from a mass of particles includes first a fully enclosed containment vessel having an internal volume bounded by a plurality of walls. The walls of the vessel define a length, a width, and a height of the internal volume. In preferred embodiments, the containment vessel is substantially longer than it is wide with a preferred width of about 8 inches to about 12 inches, and a preferred length of about 8 feet to about 12 feet. It is, however, recognized that these dimensions may be varied for specific applications. The length of the vessel defines a first end of the apparatus and a second end of the apparatus. The vessel of the present invention also includes means for feeding solid particles contaminated with a solvent into the apparatus, means for withdrawing desolventized particles and means for withdrawing separated solvent vapors.

Within the volume defined by the containment vessel, multiple desolventizing stages are disposed. Each desolventizing stage includes, generally, an upper deck and a lower deck extending across the width of the vessel generally parallel to one another over a substantial portion of the length of the vessel. The decks are separated by a vertical distance. A firs gear and a second gear or the equivalent of such gears are operatively located beyond the ends of the upper and lower decks. A means for conveying solid particles forms a continuous loop extending from the first gear over the upper surface of the lower deck and in contact with such surface, around the second gear and over the upper surface of the upper deck, and in contact therewith, back to the first gear. Drive means are provided for rotating the means for conveying solid particles.

The lower deck is heated to a sufficient temperature to cause vaporization of at least a portion of the solvent contaminating the solid particles as the particles are conveyed over the hot deck. Thus, in operation, within each stage of the desolventizer, solids are conveyed across the heated surface and solvent is vaporized therefrom with the solvent vapor flowing by gravity toward one end of the apparatus and out the means for withdrawing solvent vapor, such as a conduit, designed for such purpose. In a preferred embodiment, the upper and lower decks of each stage are inclined so that the end of each deck proximate the vapor outlet end of the vessel is at a lower elevation than the opposite end. This facilitates the flow of vapor toward the vapor outlet by gravity.

In preferred embodiments, the means for conveying solids includes a chain type conveyor having spaced wiper paddles distributed over the length thereof. The wiper paddles have a width approximately equal to the width of the deck onto which they contact for movement of the solid particles. The height of the paddle may be varied for the specific operation in which the apparatus is utilized. The necessary height can be determined based on the rate at which the solids are to be fed to the apparatus and the rate at which the means for conveying solids is to be rotated. In a preferred embodiment, the means for conveying solids moves at a rate in the range of 0.3 to 3.0 feet per minute. It has been found that this rate minimizes the detrimental effects of abrasive particles. When this preferred speed is utilized, the wipers can be constructed of carbon or stainless steel.

The description above focuses on a single stage within the apparatus of the present invention. It is preferred that multiple stages are incorporated within the apparatus to provide sufficient capacity for removing contaminants from the solid particles. To achieve multiple stages, the apparatus is designed with the stages stacked vertically within the apparatus. Each stage, as described above for the single stage, includes an upper deck and a lower deck extending over a portion of the length of the apparatus. Further, each stage includes a first and a second gear or its equivalent operatively located so that a means for conveying solids can be mounted thereon to form a continuous rotating loop which extends from the first gear over and in contact with the upper surface of the lower deck, around the second gear and over the upper surface of the upper deck back to the first gear. The lower deck of each stage is heated to effect the vaporization of the solvent as the solids are conveyed over the surface thereof. The preferred heat source is steam, wherein the lower deck comprises the upper wall of a steam-filled containment vessel.

With the multiple stage design, the lengths of the upper and lower decks along with their beginning and termination points are varied to effect a cascade of solid particles from stage to stage as the particles are conveyed through the apparatus from the first stage proximate the means for feeding solids through the lowermost stage proximate an outlet for withdrawing desolventized solids. To effect such movement of solids, the direction of rotating the conveyor in subsequent stages is alternated. Thus, for example, solids can be conveyed from left to right across the lower deck of the first stage, then back from right to left on the lower deck of the second stage, followed by movement from left to right on the lower deck of the third stage. This, of course, may be alternated for any number of stages.

The overall operation and method utilized to remove the solvent from the solid particles or granular solids is believed best described in conjunction with the preferred embodiment disclosed herein. The preferred embodiment incorporates five separation stages. An inlet chute is provided at the top of the apparatus through which solids are fed. The solids drop onto the upper surface of the upper deck of the first stage. These solids are conveyed by the means for conveying the solid particles of the first stage to the end of the upper deck, at which point the solids drop to the lower deck of the first stage which is positioned to receive such solids. The solids are conveyed over the upper surface of the lower deck of the first stage. For purposes of example, the means for conveying solids of the first stage can be assumed to be rotating in a counter-clockwise direction. The solids on the lower deck are thus conveyed generally from left to right over the surface of the deck which is heated with steam to effect vaporization of the solids. When the solids reach the end of the lower deck of the first stage, they drop onto the upper deck of the second stage.

The means for conveying solids of the second stage rotates in a clockwise direction. When the solids reach the end of the upper deck of the second stage, they drop to the upper surface of the lower deck of the second stage. The solids are then conveyed over the surface of the heated lower deck of the second stage to further effect removal of the solvent. The solids are conveyed from right to left by the clockwise rotation of the means for conveying solids of the second stage. When the solids reach the end of the lower deck of the second stage, they drop to the upper deck of the third stage.

The means for conveying solids of the third stage rotates in a counter-clockwise direction and moves the solids to the end of the upper deck of the third stage wherein the solids drop to the lower deck of the third stage which is positioned to receive the solids. The counter-clockwise movement of the means for conveying solids of the third stage moves the solids from left to right over the upper surface of the heated lower deck to effect further removal of the solvent. When the solids reach the end of the lower deck of the third stage, they drop to the upper deck of the fourth stage of the apparatus.

The fourth stage means for conveying solids rotates in a clockwise direction, and the solids are conveyed to the end of the upper deck of the fourth stage wherein they drop to the upper surface of the lower deck of the fourth stage which is positioned to receive such solids. With the clockwise rotation of the means for conveying solids of the fourth stage, the solids are moved from right to left over the surface of the lower deck to further remove solvent. When the solids reach the end of the lower deck of the fourth stage, they drop to the upper deck of the fifth stage.

The fifth stage means for conveying solids rotates in a counter-clockwise direction. When the solids reach the end of the upper deck of the fifth stage, they drop to the lower deck of a fifth stage which is positioned to receive such solids. The counter-clockwise rotation of the fifth stage means for conveying solids moves the particles from the left to the right while the heated surface of the lower deck effects further removal of the solvent.

When the particles reach the end of the lower deck of the fifth stage, the particles drop by gravity and exit the apparatus via a properly sized exit duct. The exit duct can include a rotary valve which effectively transfers the solids out of the apparatus while preventing the escape of solvent vapors.

As described above, the solid particles drop from the lower deck of a stage to the upper deck of a subsequent stage. This is believed preferred to maintain distribution of the particles on the lower decks. It is, however, recognized that the lengths of the upper decks could be adjusted so that solids dropped directly from lower deck to lower deck in subsequent stages.

As previously stated, each of the upper and lower decks of each stage are inclined to facilitate the movement of solvent vapors by the force of gravity toward one end of the apparatus. The apparatus is thus designed for preferred use in removing solvents which form vapors heavier than air. An exit duct is provided proximate the bottom of the apparatus at the end of the vessel where the decks are at a lower elevation. This allows the accumulated vapors to exit the apparatus.

With the preferred five stage embodiment, the means for rotating the means for conveying solids can include dual drive motors. The first drive motor can be positioned to effect the counter-clockwise rotation of the first, third and fifth stage conveyors via means for coupling the stages extending therebetween. The clockwise motion of the second and fourth stages can be accomplished via a second drive motor and associated means for coupling the conveyors of these stages. It is, however, recognized that other means for effecting the rotation of the means for conveying solids can be utilized within the scope of the present invention.

These and various other advantages and features of novelty which characterize the present invention are pointed out with particularity in the claims annexed hereto and forming a part hereof. However, for a better understanding of the invention, its advantages and the object obtained by its use, reference should be made to the drawings which form a further part hereof, and to the accompanying descriptive matter in which there are illustrated and described preferred embodiments of the present invention.

BRIEF DESCRIPTION OF THE DRAWINGS

In the drawings, in which like reference numerals indicate corresponding parts or elements of preferred embodiments of the present invention throughout the several views.

DETAILED DESCRIPTION OF THE PREFERRED EMBODIMENTS

Detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one of skill in the art to variously practice the invention.

Figure 1:
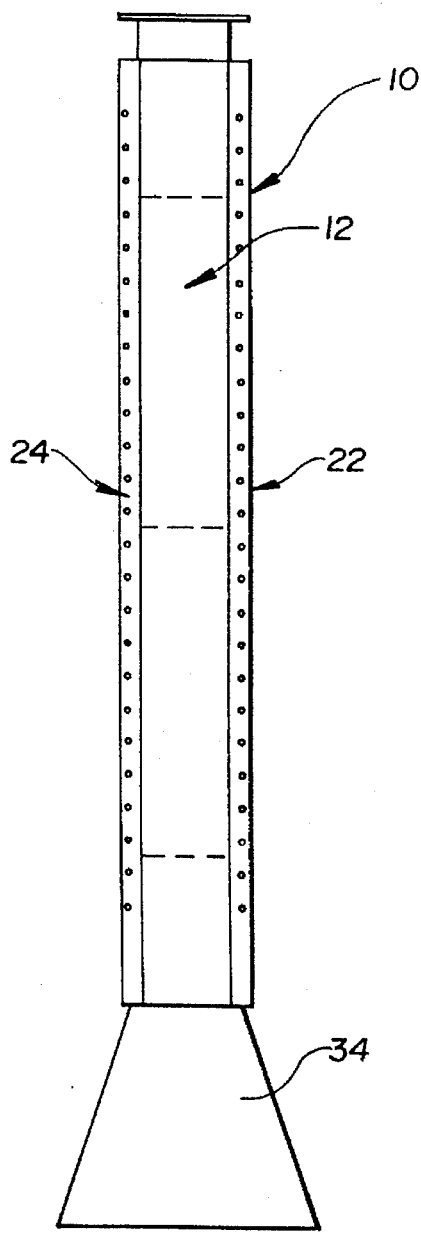
FIG. 1 is an end elevational view of the containment vessel of the present invention.
Figure 2:
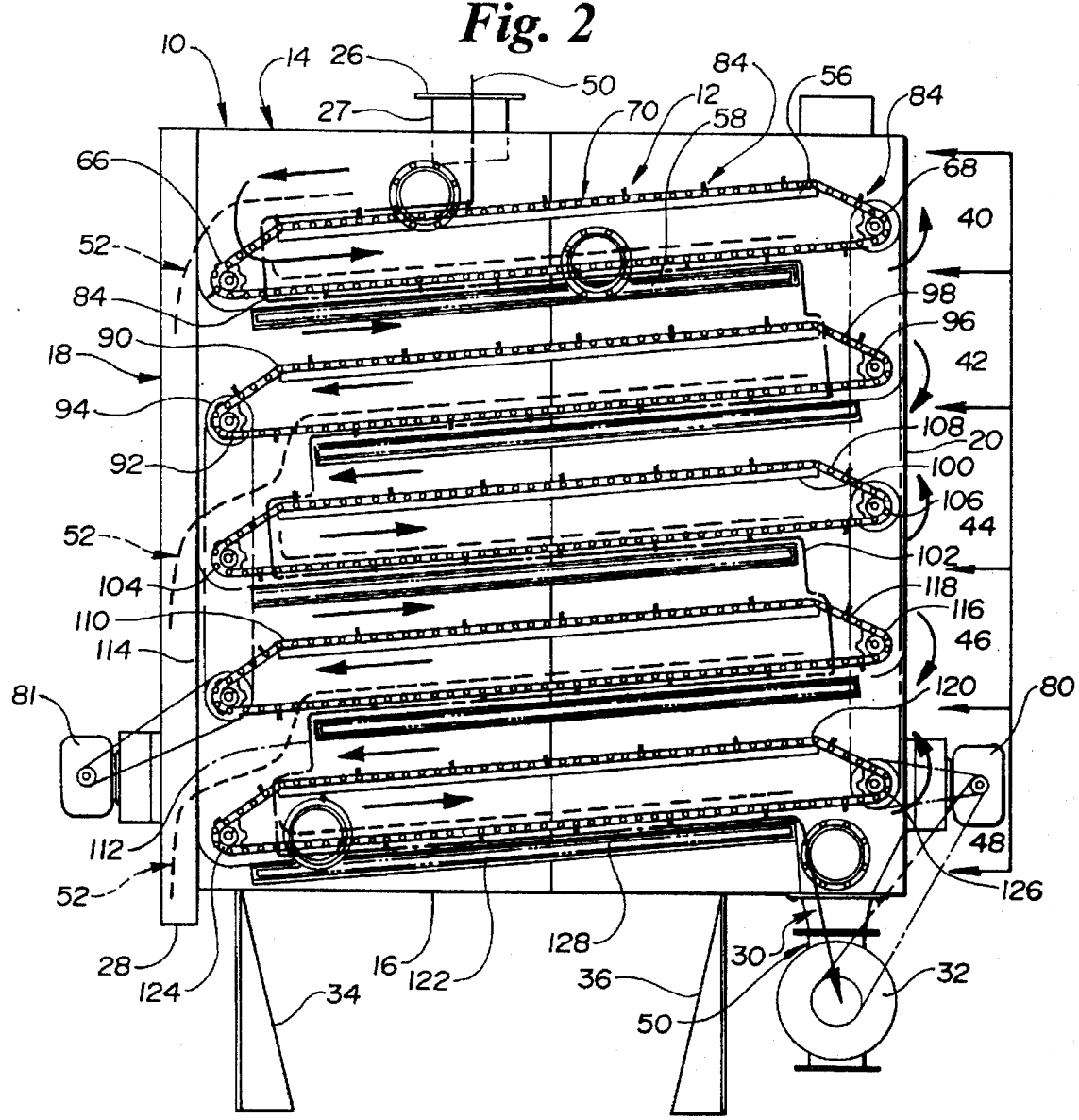
FIG. 2 is a simplified side elevational view of the apparatus of the present invention with the wall of the containment vessel cutaway to disclose the internal multiple stages of the apparatus.

Now referring to FIGS. 1 and 2, the apparatus of the present invention in a preferred embodiment is depicted. FIG. 1 depicts an end elevational view of a containment vessel 10 which houses the functional elements of the treatment process of the present invention. FIG. 2 depicts a side elevational view of the containment vessel 10 of the present invention with a side wall 22 of the containment vessel 10 cutaway to show internal multiple stages utilized to effect the solvent separation from the solids as discussed in detail below. The containment vessel 10 is fully enclosed and can be any vessel having a plurality of walls which surround and sealably define an internal volume 12. It is recognized that general shapes and sizes may be varied without being beyond the scope of the present invention. The selection of the general shape and size would be determined by one of skill in the art based on the type and quantity of material to be treated and the relative rates of treatment.

The containment vessel 10 can be manufactured from carbon steel, stainless steel or other metal to fit the service or corrosion requirements of the specific treatment process. In a preferred embodiment, carbon steel is utilized due to reduced cost.

The containment vessel is bounded by a plurality of walls, namely a top wall 14, a bottom wall 16, a first end wall 18, and a second end wall 20. As shown in FIG. 1, the containment vessel is further bounded by the first side wall 22 and a second side wall 24. In preferred embodiments, the overall length of the containment vessel is substantially greater than the width of the vessel. The relatively narrow width facilitates the even distribution of solids within the apparatus. In a preferred design, the width of the containment vessel 10 is about 8 inches to 12 inches, while the length of the containment vessel 10 may range from about 8 feet to about 12 feet. The height of the vessel, along with the length and width, will be varied for specific types of solids to be treated, the rate of treatment, and the level of contamination. Structural supports 34 and 36 are also depicted in FIG. 2. Any means for support may be utilized as necessary for a specific installation.

The containment vessel 10 also includes means 26 for feeding solids containing a solvent which is located proximate the top wall 14 of the containment vessel 10. The means for feeding solids 26 can include an inlet nozzle 27 which is properly sized for receiving expected quantities of granular particles. The containment vessel 10 also includes means for withdrawing solvent vapor. This can include an outlet nozzle 28 which is preferably located proximate the bottom wall 16 of the containment vessel 10 near the first end wall 18. Further, the containment vessel 10 includes means for withdrawing the desolventized granules from the containment vessel 10. As shown in FIG. 2, this can include a solids outlet nozzle 30 and can also include a rotary valve 32 which effectively removes the particles as dropped through the solids outlet nozzle 30 while maintaining a seal which prevents solvent vapors from escaping with the solids.

Figure 3:
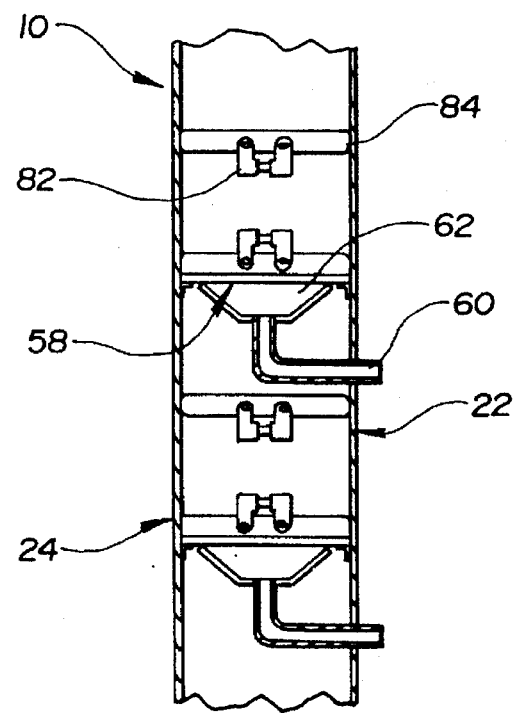
FIG. 3 is a partial end view of the apparatus with the containment vessel wall cutaway to depict the heated lower decks in relation to the means for conveying solids of the present invention.

Details of the internal structural elements which effect the separation of the solvent from the granular solids fed to the apparatus of the present invention will now be described with reference to FIG. 2 and FIG. 3. FIGS. 2 and 3 depict a preferred embodiment, wherein multiple stages are enclosed within the containment vessel to effectively remove the solvent. The stages are generally stacked vertically within the containment vessel 10 with the delineation between stages generally defined at the right side of FIG. 2. In the preferred embodiment of FIG. 2, five stages are delineated and will be referred to as Stage One 40, Stage Two 42, Stage Three 44, Stage Four 46, and Stage Five 48. For ease in understanding the overall operation of the apparatus of the present invention, the flow of granular solids 50 or particles 50 is generally depicted by a line beginning at the means for feeding granular solids 26 and ending with the discharge of solids from the outlet nozzle 30. The flow of solvent vapors 52 is generally indicated by dashed lines as the separated vapor 52 flows toward the vapor outlet nozzle 28. Further, the direction of rotation of the individual stages are indicated by the curved arrows proximate the indication of the relative stages.

Each of the stages 40, 42, 44, 46 and 48 generally contain the same structural elements. However, the location and direction of rotation of some of the elements is varied to effectively move the solids through the apparatus stages.

Referring now to Stage One 40 as depicted in FIG. 2, the first desolventizing stage includes an upper deck 56 and a lower deck 58. Each of these decks 56, 58 extend across the width of the vessel and run generally parallel to one another over a substantial portion of the length of the vessel 10. The decks 56, 58 are separated by a vertical distance. The upper deck 56 can include a solid member, however, the lower deck 58 is heated to effect the evaporation of solvent from the solids when on the surface thereof. Referring to FIG. 3, a preferred design for the lower deck 58 is depicted. The lower deck 58 includes a chamber 62 into which steam is fed and contained to heat the lower deck surface 58. A conduit 60 is provided to feed steam into the chamber 62 and condensate lines (not shown) are also included to remove condensed steam. In this way, the temperature of the deck surface may be controlled to effectively remove the solvents 52 from the solids 50 when in contact with the lower deck surface 58 of the chamber 62.

The first stage 40 also includes a first gear 66 proximate the first end 18 of the vessel 10 and a second gear 68 proximate the second end 20 of the vessel 10. A means for conveying solid particles 70 is operatively engaged by the first gear 66, second gear 68, lower deck 58 and upper deck 56 of the first stage 40. The means for conveying solid particles 70 forms a continuous loop extending from the first gear 66 over the upper surface of the lower deck 58 and in contact with such surface, then around the second gear 68 and over the upper surface of the upper deck 56 back to the first gear 66. Drive means 80 are provided for rotating the means for conveying solids 70.

In a preferred embodiment, the means for conveying solids 70 is a chain type conveyor 82 having spaced wiper paddles 84 distributed over the length thereof. The wiper paddles 84 preferably have a width approximately equal to the width of the deck onto which they contact for movement of the solid particles. It is recognized that the height of the paddle may be varied for the specific operation in which the apparatus is utilized. The necessary height can be determined based on the rate at which the solids are to be fed to the apparatus and the rate at which the means for conveying solids is to be rotated. In a preferred embodiment, the means for conveying solids moves at a rate in the range of 0.3 to 3.0 feet per minute. It has been found that this rate minimizes the detrimental effects of abrasive particles. The means for conveying solids 70 and wiper blades 84 are preferably manufactured from carbon or stainless steel.

The lower deck 58, as previously stated, of the first stage 40 gets heated to a sufficient temperature to cause vaporization of at least a portion of the solvent 52 contaminating the solid particles 50 as the particles 50 are conveyed over the heated lower deck 58. Thus, in operation, solids 50 are conveyed across the heated surface by the means for conveying solids 70 wiper blades 84 and solvent is vaporized therefrom. As shown in FIG. 2, the solvent vapor 52 flows by gravity toward the first end 18 of the containment vessel 20. As also shown in FIG. 2, the upper and lower decks of the first stage 40 are preferably inclined so that the end of the upper deck 56 and lower deck 58 proximate the first end wall 18 of the vessel 10 is at a lower elevation than the ends of the decks 56, 58, proximate the second end wall 20 of the vessel 10. It has been found that this incline facilitates the flow of vapor 52 toward the vapor outlet 28 by gravity.

As depicted in FIG. 2, Stage One 40 means for conveying solids 70 rotates in a counter-clockwise direction in the preferred embodiment. Thus, solids 50 are moved across the lower deck 58 from left to right. When the solids reach the end of lower deck 58, the solids 50 fall to Stage Two 42 of the apparatus.

Referring next to Stage Two 42, the second desolventizing stage includes an upper deck 90 and a lower deck 92. Each of these decks also extend across the width of the vessel 10 and run generally parallel to one another over a substantial portion of the length of the vessel. The decks are separated by a vertical distance. The upper deck 90 can include a solid member, however, the lower deck 92, as with the lower deck 58 of Stage One 40, is heated to effect the evaporation of solvent 52 from the solids 50 when on the surface thereof. The preferred design for the lower deck 58 is likewise utilized for lower deck 92 of Stage Two 42.

Stage Two 42 also includes a first gear 94 proximate the first end 18 of the vessel 10 and a second gear 96 proximate the second end 20 of the vessel 10. A means for conveying solid particles 98 is operatively engaged by the first gear 94, second gear 96, lower deck 92 and upper deck 90 of the second stage 42. The means for conveying solid particles 98 forms a continuous loop extending from the first gear 94 over the upper surface of the lower deck 92 and in contact with such surface, then around the second gear 96 and over the upper surface of the upper deck 90 back to the first gear 94. As with Stage One 40, the means for conveying solids 98 of Stage Two 42 is a chain type conveyor having spaced wiper paddles. Drive means 81 are provided for rotating the means for conveying solids 98.

The lower deck 92 of the second stage 42 is heated to a sufficient temperature to cause vaporization of at least a portion of the solvent 52 contaminating the solid particles 50 as the particles are conveyed over the heated deck 92. As depicted in FIG. 2, the second stage 42 means for conveying solids 98 rotates in a clockwise direction in the preferred embodiment. Thus, solids are moved across the lower deck 92 from right to left. When the solids reach the end of lower deck 92, the solids fall to Stage Three of the apparatus. Thus, in operation, the solids processed through Stage One 40 drop by gravity to the upper deck 90 of Stage Two 42 wherein the means for conveying solids 98 carries the solids over the end of the upper deck 90, wherein they fall by gravity to the lower deck 92 of Stage Two 42 for treatment. It is recognized that a portion of the solids 50 could fall directly to the lower deck 92 of the second stage 42 from the lower deck 58 of the first stage 40.

As shown in FIG. 2, the solvent vapor 52 in Stage Two 42 flows by gravity toward the first end 18 of the containment vessel 20. The upper and lower decks of this stage are also inclined to facilitate the flow of vapor 52 toward the vapor outlet 28 by gravity.

Referring next to Stage Three 44, the third desolventizing stage also includes an upper deck 100 and a lower deck 102. Each of these decks extend across the width of the vessel 10 and run generally parallel to one another over a substantial portion of the length of the vessel 10. The decks are separated by a vertical distance. The upper deck 100 can include a solid member, however, the lower deck 102, as with previous stages, is heated to effect the evaporation of solvent 52 from the solids 50 when on the surface thereof. The preferred design for the lower deck described above is also utilized in Stage Three 44.

Stage Three 44 also includes a first gear 104 proximate the first end 18 of the vessel 10 and a second gear 106 proximate the second end 20 of the vessel 10. A means for conveying solid particles 108 is operatively engaged by the first gear 104, second gear 106, lower deck 102 and upper deck 100 of the third stage 44. The means for conveying solid particles 108 forms a continuous loop extending from the first gear 104 over the upper surface of the lower deck 102 and in contact with such surface, then around the second gear 106 and over the upper surface of the upper deck 100 back to the first gear 104. As with the previous stages, the means for conveying solids 108 is a chain type conveyor having spaced wiper paddles. Drive means 80 are provided for rotating the means for conveying solids 108.

The lower deck 102 of the third stage 44 is heated to a sufficient temperature to cause vaporization of at least a portion of the solvent 52 contaminating the solid particles 50 as the particles 50 are conveyed over the heated lower deck 102. As depicted in FIG. 2, the third stage 44 means for conveying solids 108 rotates in a counter-clockwise direction in the preferred embodiment. Thus, solids are moved across the lower deck 102 from left to right. When the solids reach the end of lower deck 102, the solids fall to Stage Four 46 of the apparatus. Thus, in operation, the solids processed through Stage Two 42 drop by gravity to the upper deck 100 of Stage Three 44, wherein the means for conveying solids 108 carries the solids over the end of the upper deck 100, wherein they fall by gravity to the lower deck 102 for treatment. It is again recognized that at least a portion of the solids can fall directly from lower deck to lower deck.

As shown in FIG. 2, the solvent vapor flows by gravity toward the first end 18 of the containment vessel 20. The upper and lower decks of this stage are also inclined to facilitate the flow of vapor toward the vapor outlet 28 by gravity.

Referring next to Stage Four 46, the fourth desolventizing stage also includes an upper deck 110 and a lower deck 112. Each of these decks extend across the width of the vessel 10 and run generally parallel to one another over a substantial portion of the length of the vessel 10. The decks are separated by a vertical distance. The upper deck 110 can include a solid member, however, the lower deck 112, as with previous stages, is heated to effect the evaporation of solvents 52 from the solids 50 when on the surface thereof. The preferred design for the lower deck described above is also utilized in Stage Four 46.

Stage Four 46 also includes a first gear 114 proximate the first end 18 of the vessel 10 and a second gear 116 proximate the second end 20 of the vessel 10. A means for conveying solid particles 118 is operatively engaged by the first gear 114, second gear 116, lower deck 112 and upper deck 110 of the fourth stage 46. The means for conveying solid particles 118 forms a continuous loop extending from the first gear 114 over the upper surface of the lower deck 112 and in contact with such surface, then around the second gear 116 and over the upper surface of the upper deck 110 back to the first gear 114. As with previous stages, the means for conveying solids 118 is a chain type conveyor having spaced wiper paddles. Drive means 81 are provided for rotating the means for conveying solids 118.

The lower deck 112 of the fourth stage 46 is heated to a sufficient temperature to cause vaporization of at least a portion of the solvent 52 contaminating the solid particles 50 as the particles 50 are conveyed over the heated lower deck 112. As depicted in FIG. 2, the fourth stage 46 means for conveying solids 118 rotates in a clockwise direction in the preferred embodiment. Thus, solids are moved across the lower deck 112 from right to left. When the solids reach the end of lower deck 112, the solids fall to Stage Five 48 of the apparatus. The transfer of solids from Stage Three 46 to Stage Four 48 likewise occurs as with previous stages.

As shown in FIG. 2, the solvent vapor flows by gravity toward the first end 18 of the containment vessel 20. The upper and lower decks of Stage Four 48 are preferably inclined to facilitate the flow of vapor toward the vapor outlet 28 by gravity.

Referring next to Stage Five 48, the fifth desolventizing stage also includes an upper deck 120 and a lower deck 122. Each of these decks extend across the width of the vessel 10 and run generally parallel to one another over a substantial portion of the length of the vessel 10. The decks are separated by a vertical distance. The upper deck 120 can include a solid member, however, the lower deck 122, as with previous stages, is heated to effect the evaporation of solvent 52 from the solids 50 when on the surface thereof. The previously disclosed lower deck design is also utilized in Stage Five 48.

Stage Five 48 also includes a first gear 124 proximate the first end 18 of the vessel 10 and a second gear 126 proximate the second end 20 of the vessel 10. A means for conveying solid particles 128 is operatively engaged by the first gear 124, second gear 126, lower deck 122 and upper deck 120 of the fifth stage 48. The means for conveying solid particles 128 forms a continuous loop extending from the first gear 124 over the upper surface of the lower deck 122 and in contact with such surface, then around the second gear 126 and over the upper surface of the upper deck 120 back to the first gear 124. As with previous stages, the means for conveying solids 128 is a chain type conveyor having spaced wiper paddles. Drive means 80 are provided for rotating the means for conveying solids 128.

The lower deck 122 of the fifth stage 48 is heated to a sufficient temperature to cause vaporization of at least a portion of the solvent 52 contaminating the solid particles 50 as the particles 50 are conveyed over the heated lower deck 122. As depicted in FIG. 2, the fifth stage 48 means for conveying solid 128 rotates in a counter-clockwise direction in the preferred embodiment. Thus, solids are moved across the lower deck 122 from left to right. When the solids reach the end of lower deck 122, the solids fall to the discharge nozzle 30 of the apparatus. The transfer of solids from Stage Four 46 to Stage Five 48 likewise occurs as with previous stages.

As shown in FIG. 2, the solvent vapor flows by gravity toward the first end 18 of the containment vessel 20. The upper and lower decks of Stage Five 48 are also inclined to facilitate the flow of vapor toward the vapor outlet 28 by gravity.

From the above description of the preferred embodiment wherein five stages are utilized for the separation of solvent from particles, it is recognized that the number of stages could be varied and yet remain within the scope of the present invention. Further, the drive means disclosed for rotating the means for conveying solids in the preferred embodiment includes two motors with associated couplings to the various stages. As disclosed, the first drive means 80 is utilized to rotate Stage One, Stage Three and Stage Five in a counter-clockwise direction. The second drive means 81 is utilized to rotate Stage Two and Stage Four in a clockwise direction. The first drive means 80 is also utilized to rotate the rotary valve 32 in the exit nozzle 30. The means for coupling the drive means 80, 81 to the means for conveying solids can include chains or any known means for coupling. Although two drive means are disclosed, it is recognized that through proper gearing, a single drive means could be utilized. Alternatively, a separate drive means could be utilized for each stage of the apparatus.

New characteristics and advantages of the invention covered by this document have been set forth in the foregoing description. It will be understood, however, that this disclosure is, in many respects, only illustrative. Changes may be made in details, particularly in matters of shape, size and arrangement of parts, without exceeding the scope of the invention. The scope of the invention is, of course, defined in the language in which the appended claims are expressed.

What is claimed is:

1. Apparatus for separating a solvent entrained in solid particulate material, said apparatus comprising:
   (a) a fully enclosed containment vessel defining the height, width and length of said apparatus and having means for feeding a stream of solid particles having said solvent dispersed therein, means for withdrawing vaporized solvent and means for withdrawing desolventized particles; and
   (b) multiple desolventizing stages disposed within said fully enclosed containment vessel wherein each of said multiple desolventizing stages includes,
      (1) an upper deck having a first end and a second end, said upper deck extending across said width of said vessel over a substantial portion of the length thereof,
      (2) a lower deck having a first end and a second end, said lower deck extending across said width of said vessel over a substantial portion of the length thereof vertically spaced from and generally parallel to said upper deck, wherein said lower deck further includes means for heating said lower deck to effect vaporization of the solvent,
      (3) a first gear disposed between said upper deck and said lower deck beyond the first end of said upper deck and the first end of said lower deck,
      (4) a second gear disposed between said upper deck and said lower deck beyond the second end of said upper deck and the second end of said lower deck,
      (5) means for conveying said solid particles, said means forming a continuous loop which operatively extends from said first gear over said lower deck and in contact therewith, over said second gear, over said upper deck and in contact therewith and back to said first gear, and
      (6) drive means for rotating said means for conveying solid wherein in use said solid particles are conveyed over the lower heated deck to vaporize said solvent.

2. The apparatus of claim 1, wherein said drive means rotates said means for conveying said solid particles at a rate in the range of 0.3 to 3.0 feet per minute.

3. The apparatus of claim 1, wherein said means for conveying said solid particles comprises a chain-type conveyor having spaced wiper paddles distributed over the length thereof.

4. The apparatus of claim 3, wherein said wiper paddles have a width approximately equal to the width of said vessel.

5. The apparatus of claim 4, wherein said chain-type conveyor and paddles are manufactured from carbon steel.

6. The apparatus of claim 1, wherein said means for heating said lower deck comprises a steam heated vessel having a steam inlet and a condensate outlet so that the temperature of said lower deck can be maintained at a selected value.

7. The apparatus of claim 1, wherein said apparatus includes five desolventizing stages disposed within said vessel.

8. The apparatus of claim 7, wherein said five stages are spaced vertically and said solid particles cascade from a lower deck of a stage to an upper deck of a subsequent stage.

9. The apparatus of claim 1, wherein said multiple desolventizing stages are spaced vertically and said solid particle cascade from a lower deck of a stage to a lower deck of a subsequent stage for further treatment.

10. An apparatus for separating a solvent from solid particles, said apparatus comprising:
    (a) a fully enclosed containment vessel defining the height, width and length of said apparatus having means for feeding a stream of said solid particles having said solvent dispersed therein, means for withdrawing vaporized solvent and means for withdrawing desolventized particles;
    (b) a first desolventizing stage disposed within said fully enclosed containment vessel wherein said first desolventizing stage includes,
       (1) a first upper deck having a first end and a second end, said first upper deck extending across said width of said vessel over a substantial portion of the length thereof,
       (2) a first lower deck having a first end and a second end, said first lower deck extending across said width of said vessel over a substantial portion of the length thereof vertically spaced from and generally parallel to said first upper deck, wherein said first lower deck further includes means for heating said first lower deck,
       (3) a first gear disposed between said first upper deck and said first lower deck beyond the first end of said first upper deck and the first end of said first lower deck,
       (4) a second gear disposed between said first upper deck and said first lower deck beyond the second end of said first upper deck and the second end of said first lower deck,
       (5) first means for conveying said solid particles, said means forming a continuous loop which operatively extends from said first gear over said first lower deck and in contact therewith, over said second gear, over said first upper deck and in contact therewith and back to said first gear, and
       (6) first drive means for rotating said means for conveying solids wherein in use said solid particles are conveyed over the first lower heated deck to vaporize said solvent; and
    (c) a second desolventizing stage disposed within said fully enclosed containment vessel below said first desolventizing stage so as to receive said solid particles subsequent to conveyance over said first lower heated deck, wherein said second desolventizing stage includes,
       (1) a second upper deck having a first end and a second end, said second upper deck extending across said width of said vessel over a substantial portion of the length thereof,
       (2) a second lower deck having a first end and a second end, said second lower deck extending across said width of said vessel over a substantial portion of the length thereof vertically spaced from and generally parallel to said second upper deck, wherein said second lower deck further includes means for heating said second lower deck,
       (3) a first gear disposed between said second upper deck and said second lower deck beyond the first end of said second upper deck and the first end of said second lower deck,
       (4) a second gear disposed between said second upper deck and said second lower deck beyond the second end of said second upper deck and the second end of said second lower deck, (5) second means for conveying said solid particles, said means forming a continuous loop which operatively extends from said first gear over said second lower deck and in contact therewith, over said second gear, over said second upper deck and in contact therewith and back to said first gear, and (6) second drive means for rotating said means for conveying solid wherein in use said solid particles are conveyed over said second lower heated deck to vaporize said solvent.

11. The apparatus of claim 10, wherein said first and said second drive means rotates said first and said second means for conveying said solid particles, respectively, at a rate in the range of 0.3 to 3.0 feet per minute.

12. The apparatus of claim 10, wherein said first and said second means for conveying said solid particles each comprises a chain-type conveyor having spaced wiper paddles distributed over the length thereof.

13. The apparatus of claim 12, wherein said wiper paddles have a width approximately equal to the width of said vessel.

14. The apparatus of claim 13, wherein said chain-type conveyor and paddles are manufactured from carbon steel.

15. The apparatus of claim 10, wherein said means for heating said first and said second lower decks each comprise a steam heated vessel having a steam inlet and a condensate outlet so that the temperature of said lower decks can be maintained at a selected value.

16. The apparatus of claim 10, wherein said upper and lower decks are inclined so that gravity facilitates the flow of vaporized solvent toward said means for withdrawing solvent.

17. Apparatus for separating a solvent from solid particulate material by which it is carried, comprising:

(a) a closed containment vessel having a particulate ingress port at an upper extremity thereof, a desolventized particulate material egress port proximate a lower extremity thereof, and a solvent egress port, spaced from said desolventized particulate material egress port, proximate a lower extremity thereof;

(b) a first desolventizing stage extending along an axis within said containment vessel, said first desolventizing stage including an upper deck onto which said solid particulate is deposited through said ingress port, a lower deck, generally parallel to said upper deck, means for vaporizing said solvent carried in said particulate material, and means for conveying said solid particulate material deposited onto said upper deck along said upper deck in a first direction and onto said lower deck for movement in an opposite direction;

(c) at least one additional desolventizing stage, oriented along an axis generally parallel to the axis along which said first desolventizing stage is oriented and disposed beneath said first desolventizing stage, each of said additional desolventizing stages including at least one deck, generally parallel to said upper and lower decks of said first desolventizing stage, means for vaporizing said solvent carried in said particulate material, and means for conveying said solid particulate along said at least one deck of said additional desolventizing stages; and (d) a solvent exhaust manifold in communication with said first desolventizing stage and said additional desolventizing stages at corresponding ends thereof, said exhaust manifold for conveying solvent vapors to said solvent egress port.

18. Apparatus of claim 17, wherein said upper and lower decks of said first desolventizing stage and said decks of said additional desolventizing stages slope downwardly toward said solvent exhaust manifold.

19. Apparatus of claim 17, wherein said means for vaporizing said solvent comprises means for heating said upper and lower decks of said first desolventizing stage and said decks of said additional desolventizing stages.

* * * * *